United States Patent [19]

Waas

[11] Patent Number: 4,824,286
[45] Date of Patent: Apr. 25, 1989

[54] APPARATUS FOR DISSIPATING SURFACE WAVES, PARTICULARLY FOR PROTECTING FLOATING OR FIXED STRUCTURES OR COASTS

[76] Inventor: Heinrich Waas, Am Stadtwald 50, 5300 Bonn (Bad Godesberg), Fed. Rep. of Germany

[21] Appl. No.: 37,102

[22] Filed: Apr. 9, 1987

Related U.S. Application Data

[63] Continuation of Ser. No. 745,310, Jun. 19, 1985, abandoned.

[30] Foreign Application Priority Data

Jun. 20, 1984 [DE] Fed. Rep. of Germany ....... 3432888

[51] Int. Cl.$^4$ .............................................. E02B 3/06
[52] U.S. Cl. ....................................... 405/27; 405/26; 405/30
[58] Field of Search ................ 405/15, 16, 19, 21–23, 405/25–28, 30, 32–35, 63, 64, 70, 71

[56] References Cited

U.S. PATENT DOCUMENTS

| | | | |
|---|---|---|---|
| 3,237,414 | 3/1966 | Straub et al. | 405/26 |
| 3,276,210 | 10/1966 | Stitt | 405/27 |
| 3,357,192 | 12/1967 | Hibarger | 405/27 |
| 3,755,829 | 9/1973 | Walklet | 405/35 X |
| 3,863,455 | 2/1975 | Fuller | 405/27 |
| 3,884,042 | 5/1975 | Anderson et al. | 405/27 |
| 4,027,486 | 6/1977 | Dougherty | 405/26 X |
| 4,150,909 | 4/1979 | Hibarger et al. | 405/27 |
| 4,188,153 | 2/1980 | Taylor | 405/30 X |

FOREIGN PATENT DOCUMENTS

| | | | |
|---|---|---|---|
| 2532255 | 2/1977 | Fed. Rep. of Germany | 405/63 |
| 2303119 | 10/1976 | France | 405/30 |
| 2407293 | 6/1979 | France | 405/30 |
| 829764 | 5/1981 | U.S.S.R. | 405/27 |
| 1576133 | 10/1980 | United Kingdom | 405/63 |

*Primary Examiner*—Randolph A. Reese
*Assistant Examiner*—John A. Ricci
*Attorney, Agent, or Firm*—Trexler, Bushnell, Giangiorgi & Blackstone

[57] ABSTRACT

Apparatus for dissipating surface waves to protect floating or fixed structures comprises a floatable carpet formed of floating motor vehicle tires which are horizontally disposed and arranged in rows. Flexible spacers interconnect the tires in such a manner that the floating carpet provides a structure that is stiff in the horizontal direction and flexible in the vertical direction. The individual tires assume zig-zag inclinations to the portions for interconnecting the tires in the upper and lower areas thereof, and inflatable supporting hoses extending between adjacent tires in the areas between the upper and lower spacers.

4 Claims, 3 Drawing Sheets

ZEV = ENERGY DISSIPATION ZONE

ZEV = ENERGY DISSIPATION ZONE

APPARATUS FOR DISSIPATING SURFACE WAVES, PARTICULARLY FOR PROTECTING FLOATING OR FIXED STRUCTURES OR COASTS

This application is a continuation, of application Ser. No. 745,310, filed June 14, 1985, abandoned.

BACKGROUND OF THE INVENTION

The present invention relates to an apparatus for calming or dissipating surface waves, particularly for the protection of floating or fixed structures or coasts, comprising a floatable carpet made from a plurality of floating bodies consisting of motor vehicle tires, interconnected by cables or chains, and arranged in juxtaposed, successive rows.

An apparatus of this type is known from the German journal "Meerestechnik", February 1977, p. 26, in which a plurality of vertical vehicle tires combined to form a floating carpet are used as wave breakers. The tires are interconnected by means of cables or chains. Due to the fact that in this floating carpet the vehicle tires are positioned vertically, such a floating carpet cannot be used for preventing sand movements on the sea or ocean bed particularly in the vicinity of the coast, because such a floating carpet, if lowered on to the ocean bed, will not be laid out thereon, because in the lowered state the individual tires would assume the most varied angular positions relative to one another on the ocean bed, so that they would be exposed to the current and consequently the floating carpet lowered on to the ocean bed would be carried along by the current and certainly no adequate anchoring to the ocean bed is ensured. Such a floating carpet cannot stop sand movements on the ocean bed. In addition, the vehicle tires of this floating carpet as a result of their vertical arrangement therein, only project by a very small portion above the water surface, so that it can in no way be ensured that wave energy will be dissipated over a large area.

Another floating carpet construction is described in U.S. Pat. No. 1,933,597. In this case, the floating carpet comprises floating bodies joined together in the form of a U, which are constructed as hollow bodies and are interconnected in such a way that a wave-calmed water zone is formed within the water surface bounded by the floating carpet and serves as a landing surface for watercraft, the individual floating bodies of the U-shaped floating carpet surrounding the wave-calmed water zone in enclosure-like manner. The thus obtained floating carpet has wave-breaking characteristics for obtaining a wave-calmed inner zone. However, such a floating carpet cannot be lowered on to the ocean bed and in no way is suitable for preventing sand movements there.

SUMMARY OF THE INVENTION

The problem of the present invention is to provide an apparatus for dissipating surface waves, particularly for protecting floating or fixed structures or coasts, which leads to an economic and inexpensive coastal protection or a protection for floating structures or ships anchored in the ocean by moving the wave energy dissipation zone into an area located outside the coast region or other structure to be protected, and which can also be used for preventing sand migrations on the ocean bed, particularly in the vicinity of the coast.

According to the invention, this problem is solved by an apparatus of the aforementioned type, wherein the floating carpet comprises a substantially horizontally disposed vertically flexible structure made up of horizontally positioned motor vehicle tires, which are interconnected by means of upper and/or lower spacers and are arranged on spaced floats, such as e.g. inflatable supporting hoses.

Such an apparatus provides an unconventional system with the possibilitity of calming or dissipating the wave energy over a larger area. Such a coastal protection formed from a floating carpet of vehicle tires can be inexpensively manufactured. Such an apparatus also makes it possible to influence sand migrations in the coastal region. Due to the fact that the vehicle tires in the floating carpet are positioned horizontally, when the carpet is lowered on to the ocean bed the tires engage with the latter, so that there can be sand accumulations in the interior of each tire, so that sand migration on the ocean bed is stopped, whilst simultaneously the sand accumulations in the inner areas of the tires contribute to the securing of the floating carpet on the ocean bed.

Thus, due to the fact that the vehicle tires are arranged on inflatable supporting hoses, it is possible to maintain the floating carpet in the inflated state of the supporting hoses on the water surface, so that the carpet can adapt to all wave movements of the water.

Advantageous developments of the invention are characterized in the subclaims.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 4:
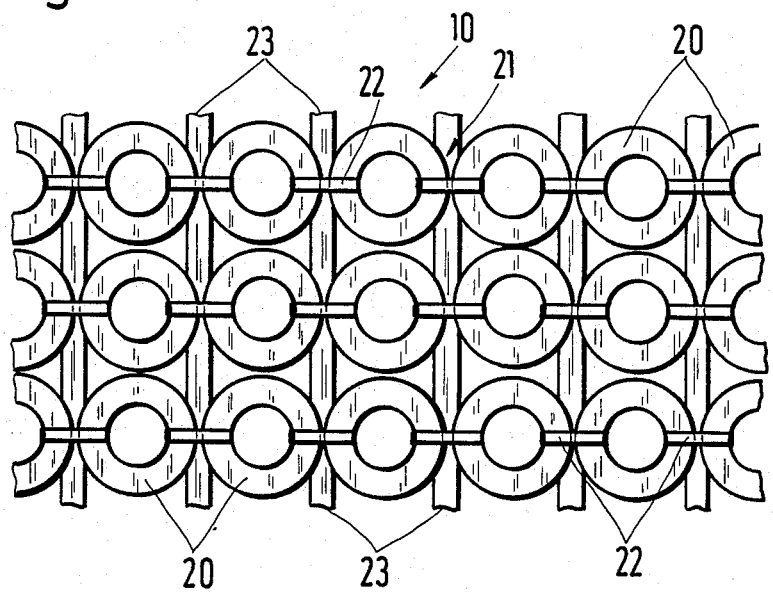
FIG. 4 a plan view of a portion of a motor vehicle tire floating carpet.
Figure 7:
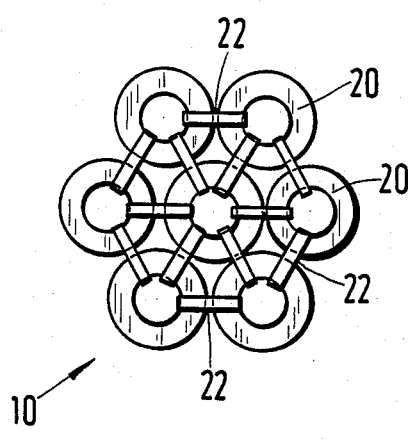
FIGS. 7 and 8 plan views of different arrangements of the vehicle tires for forming a floating carpet.
Figure 8:
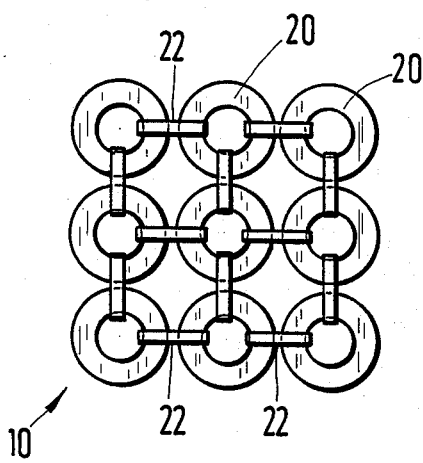

The apparatus for protecting coasts and wave-exposed structures or structures in the vicinity of the shore comprises a floating carpet 10, which consists of a plurality of juxtaposed, successive or reciprocally displaced motor vehicle tires 20 arranged in rows and which are interconnected by means of fascines 21 (FIGS. 4, 7 and 8).

Figure 6:
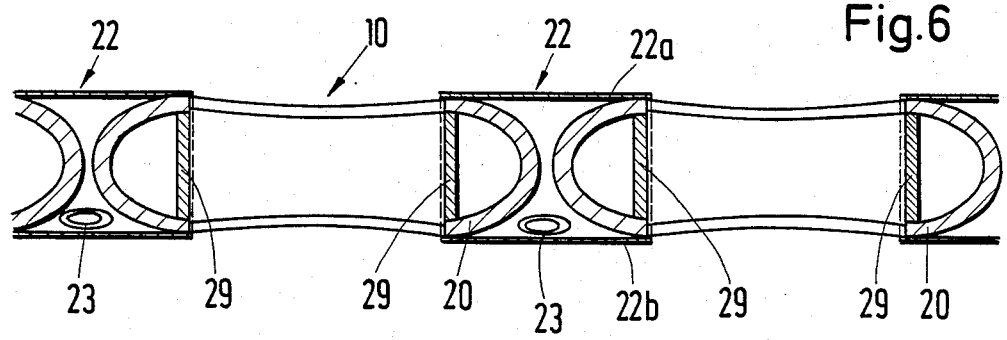
FIG. 6 a vertical section of a portion of the floating carpet.

The floating carpet 10 shown in FIG. 4 comprises commercially available, mainly used vehicle tires 20, which are interconnected in carpet-like manner by means of a fascine 21. The latter comprises strips, cables, spacers or other suitable connecting means. In the case of the embodiment shown in FIGS. 4 and 6, the vehicle tires 20 are interconnected by means of spacers 22, which simultaneously form a connecting element between the vehicle tires, the spacers holding together and interconnecting the individual tires 20 in the upper and lower areas thereof. The connecting means comprises upper spacers 22a and lower spacers 22b. As can be seen in FIG. 6, the spacer 22 is constructed in clip or ring-like manner and embraces two tires 20, accompanied by the formation of a top spacer portion 22a and a bottom spacer portion 22b. If very high waves are expected, the tires are appropriately arranged in such a way that each of them is connected with four or six adjacent tires (FIGS. 7 and 8). The number of spacers or connecting elements is admittedly made larger as a result of this, but so is the strength of the floating carpet.

The fascine 21 for floating carpet 10 formed from vehicle tires 20 comprises supporting hoses 23, which are inflatable, i.e. can be filled with air, and which are constructed in lattice-like manner, and which carry interconnected vehicle tires. Alternatively, they are arranged in parallel, spaced manner, the reciprocal spacing of in each case two supporting hoses 23 roughly corresponding to the external diameter of a tire, so that in each case two adjacent tires with their portions adjacent the light areas therebetween come to rest on one of the hoses 23 (FIG. 4). Advantageously the supporting hoses 23 are arranged horizontally on the bottom spacer portions 22b or on the lower spacers (FIG. 6). All the supporting hoses 23 are connected to a not shown air supply connection enabling all the hoses to be inflated. To prevent the sinking of the floating carpet if one of the supporting hoses 23 is damaged, certain hoses can be combined to form groups of hoses each with its own air supply connection. This air supply connection is connected to a compressor not shown in the drawings, or to some other compressed air production means. If the supporting hoses 23 are filled with air, then they form the floating element for the floating carpet 10. If the supporting hoses 23 are emptied, then the floating carpet 20 sinks on to the ocean bed as a result of the weight of tires 20.

Figure 5:
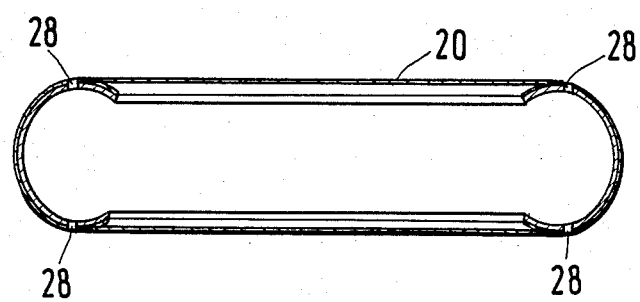
FIG. 5 a vertical section through a motor vehicle tire floating carpet.

The vehicle tires used for producing the floating carpet 10 can be of a commercially available type (FIG. 5). However, it is advantageous, prior to fixing, to so deform together the vehicle tires 20, that an approximately wedge-shaped form is obtained on the tread side, as shown in FIG. 6. On the tread side, each vehicle tire 20 is widened or expanded at two points by fillers, 29.

Figure 1:
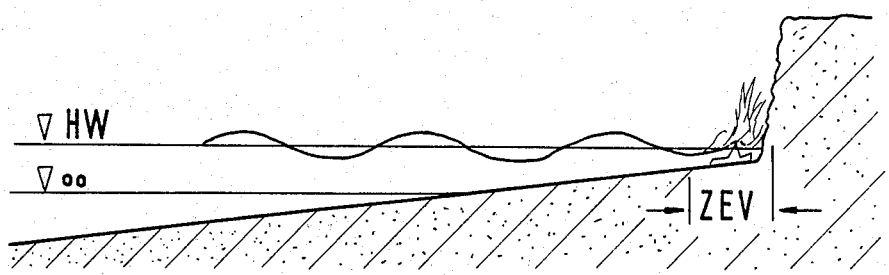
FIG. 1 a diagrammatic view of an unprotected coast with a small wave energy dissipation zone.
Figure 2:
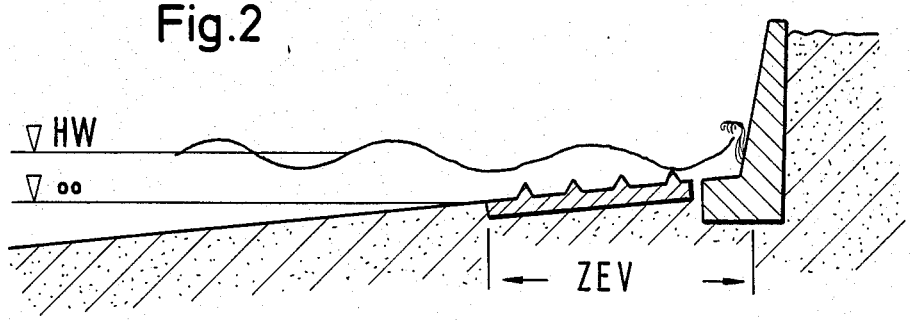
FIG. 2 a diagrammatic view of a protected coast with a wave energy dissipation zone located in the vicinity of the structure.
Figure 3:
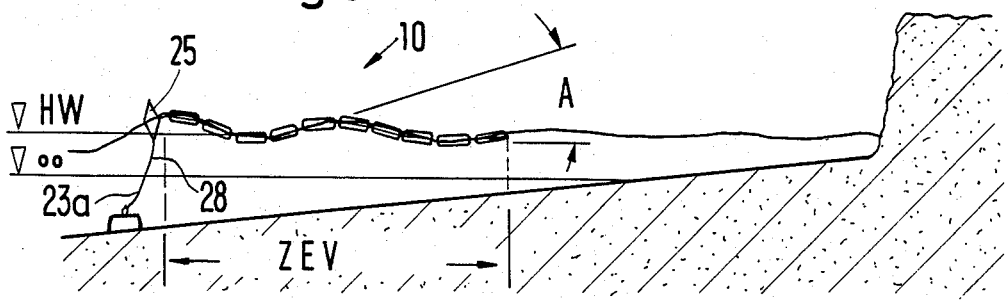
FIG. 3 a diagrammatic view of a coast protected by a floating carpet with a waver energy dissipation zone well away from the coast.

However, it is important that the fascine 21 holding together the tires 20 has a certain elasticity, so that the tires 20 can adapt to the wave movements. Spacers 22 are elastic and made from corresponding suitable materials. The vehicle tires 20 are arranged with respect to one another in such a way that the planes of the tires form, with respect to the main wave direction, a zig-zag surface with angles of inclination of approximately 10° to 25° to the horizontal plane such as is shown at in FIG. 3.

Figure 10:
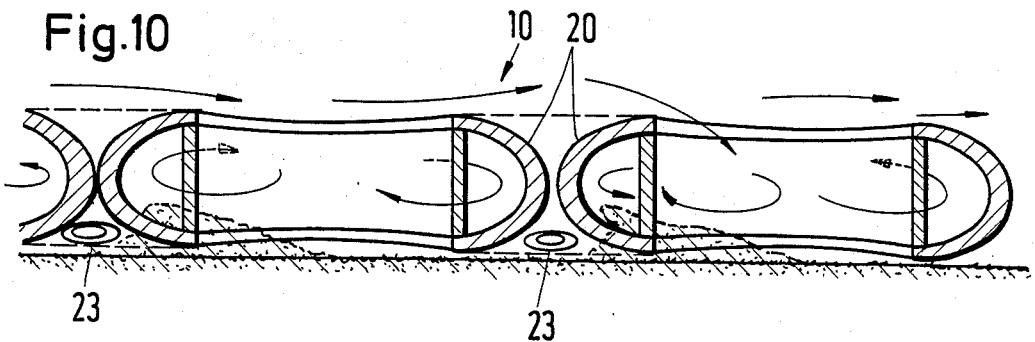
FIG. 10 a vertical section through a floating carpet lowered on to the ocean bed.

The coastal protection apparatus constructed as a floating carpet 10 is used on the one hand for dissipating ocean waves and on the other for preventing sand movements (FIG. 10).

Figure 11:
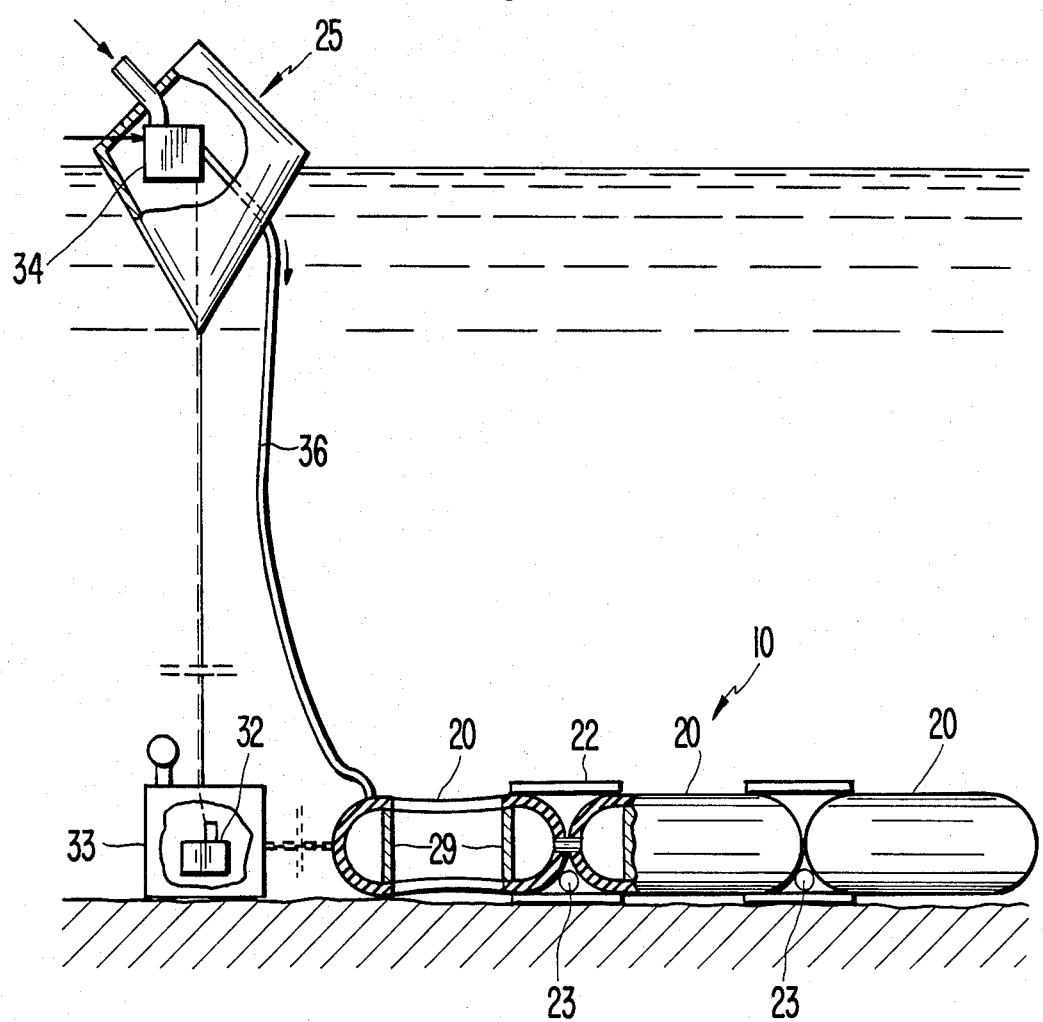

For dissipating the energy of waves in the vicinity of a coast, it is particularly advantageous to use a floating carpet 10, because for the production of the latter it is possible to use old, no longer usable vehicle tires, so that the possibility is provided to dissipate the ocean wave energy with maximum cost effectiveness. A floating carpet 10 is formed from the tires 20 and is anchored away from the coast to be protected or on a structure on the water surface and is anchored to the ocean bed by suitable means, such as buoy stones, ground anchors, etc. 33, as shown in FIGS. 10 and 11, by arranging the floating carpet 10 at a distance from the coast, the wave energy dissipation zone is positioned well in front of the coast and in a large area, which is fixed by the dimensions of the floating carpet 10. If the supporting hoses 23 of fascine 21 are filled with air, carpet 10 floats on the ocean surface. However, if the supporting hoses 23 are emptied by allowing the air to escape, then the floating carpet 10 sinks on to the ocean bed. By anchoring, much as for navigation marks, the floating carpet 10 can be held in position. The width of the carpet 10 must be somewhat greater than the length of the shore which is to be protected from wave action. The seaward extension of the floating carpet 10 must at least represent the length of the most important waves to be dissipated. Fundamentally, the vehicle tires 20 can be used unchanged for producing the floating carpet 10. However, it is advantageous if the vehicle tires are deformed by simple and inexpensive means, as shown in FIG. 6, in order to increase the resistance against horizontal currents. It is also advantageous to provide holes 28 in the side walls of tires 20, in order to pemit the escape of air or grains of sand, which have penetrated the inner areas of the tires during the operation of the floating carpet.

The coastal protection apparatus can be used in such a way that only in the case of a special danger, such as for steep coasts or a structure, is the floating carpet 10 located on the ocean bed, raised by blowing air into the hose system or into the floating bodies. For the remainder of the time the floating carpet 10 remains on the ocean bed.

The submersible floating carpet can also be used for another purpose which is important in connection with the protection of the coast. If placed on sandy beds, the floating carpet can prevent the sand being carried away by the current or can contribute to the accumulation of sand carried by the current. To prevent the floating carpet being flushed into the sand, it is necessary to raise the carpet briefly by blowing air from a pipe 27 and a hose 28 by use of an air pump 31 into the supporting hose 23, e.g. at the turn of the tide. For such a use, there is a much smaller energy consumption than in the case of the known expensive process of flushing up sand.

Figure 9:
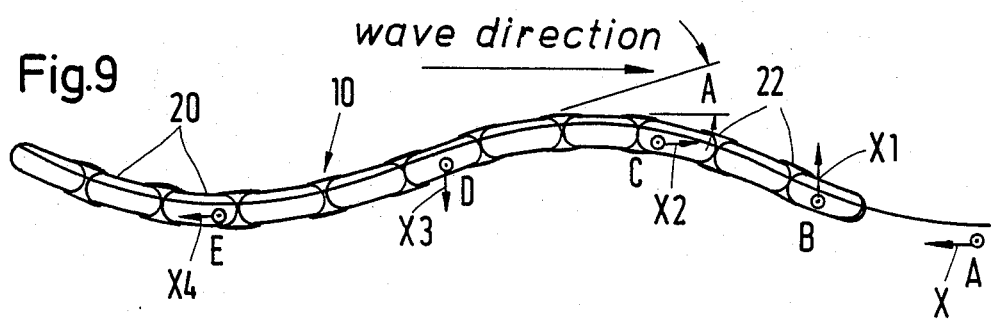
FIG. 9 the wave dissipation using a floating carpet.

It is known that even an oil film calms waves on the water. However, it is much more effective to calm the waves by a carpet 10 of tires 20 floating thereon. FIG. 9 shows a wave with a floating carpet 10, where the tires are joined in such a way that the carpet is horizontally rigid, but is sufficiently flexible vertically for it to precisely follow the wave surface. At point E, the leftward-directed current existing there will flow horizontally against a vehicle tire, whilst at point C there is a horizontal flow to the right against a tire. Between these points, the direction of flow action changes counter-clockwise, first downwards and then to the right. The energy consumption is consequently at a maximum at E and C and at a minimum at D. Whereas the oil film can only remove energy from the water on the surface of the waves, the tires, corresponding to their thickness and shape, can remove energy from the water at a distance of 0 to 20 cm from the surface.

The vehicle tires additionally dissipate wave energy, to the extent that they are interconnected to form a floating carpet 10 (FIG. 4), which as a bending-elastic plate can form natural vibration shapes, which are roughly in resonance with the most important waves. Then at point D (FIG. 9), there is a vertical amplitude of the vehicle tire relative to the water surface. Apart from the bending elasticity of the carpet, importance is also attached to an adequately large mass which, apart from the vehicle tires, includes the entrained water mass. This is very considerable as a result of the annular, centrally open form of the tires.

Floating carpet 10 comprises a fascine 21 of motor vehicle tires 20, inflatable supporting hoses 23 and connecting means of pieces in the form of bands, cables, spacers, etc. 22, all of which are elastic. As the floating carpet rarely has to float, e.g. only in the case of storm tides, it is subject to little wear. If floating carpet 10 is placed horizontally on the ocean bed, it is subject to no wear. Old vehicle tires are the cheapest elastic material, which does not age in water, which can be used for producing floating carpet 10. In addition, they have an appropriate specific gravity just above 1. It is advantageous to provide floating carpets of approximately 40×40 m along the maritime belts to be protected, and to fix each carpet to one or two anchored buoys 25 (see FIG. 11). One of the buoys could be provided with a piezometer (indicated diagrammatically at 32) fitted to an anchor stone 33. When the average, pulsating water pressure reaches a given level, then the motor-driven pneumatic pump 34 fitted into the buoy automatically starts up, to inflate the inflatable hoses 23 by way of a connected hose 36 so that the carpet on the ocean bed floats.

What is claimed is:

1. Apparatus for dissipating surface waves to protect floating or fixed structres or coasts, comprising a floatable carpet formed from a plurality of floating motor vehicle tires in horizontal disposition and arranged in rows, flexible spacer means interconnecting said tires characterized in that the floating carpet (10) provides a structure that is stiff in a horizontal direction and flexible in a vertical direction such that individual tires assume zig-zag inclinations therebetween under influence of main waver directions at an installed location of said carpet and with the angles of inclination being about 10 degrees to 25 degrees to a horizontal plane, said spacer means including upper and lower spacers (22A, 22B) for interconnecting said tires in upper and lower areas thereof, and inflatable supporting hoses (23) extending between adjacent tires and traversing the areas between said upper and lower spacers for supporting said interconnected tires on inflation, said tires being internally expanded by fillers (29).

2. Apparatus according to claim 1, further characterized in that the fillers (29) internally expand or widen each tire at two points.

3. Apparatus according to claim 1, characterized in that the tires (20) are provided on their side walls with perforations (28) punctured therethrough.

4. Apparatus according to claim 1, characterized in having means for anchoring said floating carpet, said means comprising a buoy having a motor-driven pneumatic pump, means connecting said pump to said inflatable hoses, and piezometer means for switching on said motor.

* * * * *